(12) United States Patent
Yamauchi et al.

(10) Patent No.: US 6,527,018 B2
(45) Date of Patent: Mar. 4, 2003

(54) METHOD AND SYSTEM FOR OPTIMIZING BATCH PROCESS OF PREPARING SOLUTION

(75) Inventors: Shingo Yamauchi, Kanagawa (JP); Shinichiro Kuwabara, Tokyo (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 34 days.

(21) Appl. No.: 09/874,357

(22) Filed: Jun. 6, 2001

(65) Prior Publication Data

US 2002/0026963 A1 Mar. 7, 2002

(30) Foreign Application Priority Data

Jun. 7, 2000 (JP) .................................. 2000-170255
Jul. 4, 2000 (JP) .................................. 2000-202742

(51) Int. Cl.⁷ .............................................. B65B 3/04
(52) U.S. Cl. ........................... 141/9; 141/104; 141/105
(58) Field of Search .................... 141/1, 4, 9, 83, 141/100–105; 430/347, 567

(56) References Cited

U.S. PATENT DOCUMENTS 5,308,593 A * 5/1994 Kobayashi et al. ......... 422/243
5,339,875 A 8/1994 English et al. .............. 141/9

FOREIGN PATENT DOCUMENTS

| JP | 4-95700 | 3/1992 | ............ F17D/1/08 |
| JP | 7-71699 | 3/1995 | ............ F17D/3/03 |
| JP | 7-198100 | 8/1995 | ............ F17D/3/03 |

OTHER PUBLICATIONS

Patent Abstracts of Japan. 07–071699. Mar. 17, 1995.
Patent Abstracts of Japan. 07–198100. Aug. 1, 1995.
Patent Abstracts of Japan. 04–095700. Mar. 27, 1992.

* cited by examiner

Primary Examiner—Timothy L. Maust
(74) Attorney, Agent, or Firm—Sughrue Mion, PLLC

(57) ABSTRACT

Each of the batch processing lines has its exclusive one set material processing line independent from others and is operated according to the special algorithm which changes an amount to be prepared in the batch process in a few batches in the final stage of the downstream process based on a calculated total amount required by the downstream process to complete manufacturing. The method for preparing is capable of easily coping with the change of raw materials or prescriptions for the product without increasing or changing existing pipe lines or chemical liquid stock vessels and almost completely avoiding a waste of material.

11 Claims, 4 Drawing Sheets

METHOD AND SYSTEM FOR OPTIMIZING BATCH PROCESS OF PREPARING SOLUTION

FIELD OF THE INVENTION

This invention relates to optimization of batch process where a plurality of batch processing lines are simultaneously used and the same batch process is repeatedly used to meet the required total amount of product to be made in the following downstream manufacturing process, which are used in the industry such as chemical industry, food industry or photographic industry.

BACKGROUND OF THE INVENTION

Typically in manufacturing photographic materials, batch process is usually used because a great variety of raw materials is used, many kinds of coating liquids must be simultaneously prepared for carrying out simultaneous multi-coating and change of the raw material or prescription of the coating liquid are frequently made.

FIG. 4 shows a schematic diagram of conventional coating liquid preparation system used in a manufacturing process of photographic materials. The system includes Multi-purpose chemical liquid preparation vessels 13-1, 13-2, 13-3 and others (not shown), chemical liquid stock vessels 12-1, 12-2, . . . , and others (not shown), chemical liquid feeding pipe lines 11 and coating liquid preparation vessels 10-1 to 10-n. Each one of the multi-purpose chemical liquid preparation vessels is usually connected to a plurality of the chemical liquid stock vessels, for example, vessel 13-1 is connected to three different stock vessels 12-1, 12-2 and 12-3. Each one of stock vessels is connected to the pipe line 11 some of which are connected to a plurality of coating liquid preparation vessels by branching which need the common chemical liquid. The number of the coating liquid preparation vessels corresponds to the number of layers to be simultaneously coated on a photographic substrate to make photographic film. To make the system operative, a lot of automatic valves and liquid measuring devices are installed. Whenever the prescription of coating liquid is changed, the pipe line connection has to be changed by changing or increasing the pipe line branch together with related valves and measuring devices.

(1) Japanese Laid-open Patent Publication (JP-A) 095700/92 (tokkai-hei 04-095700) shows chemical liquid distribution process and apparatus where chemical liquid in a vessel is distributed to a plurality of vessels for preparing required solution such as coating solution via a common conduit and branches with valves therefrom. In this system, the common conduit is inclined to make it easy to clean the chemical liquid vessel and the common conduit separately and simultaneously at the change-over of the chemical liquid, which leads to reducing cleaning time and amount of cleaning liquid.

(2) In JP-A 071699/95 (tokkai-hei 07-071699), it is proposed to provide an automatic pipe-connecting device in a feed-line switching station, which is disposed between stock tanks and chemical fluid measuring devices located downstream next to the stock tanks, in order to reduce the number of feed-line switching valves, to prevent a fluid of different kind from mixing generated when switched connection of piping and minimize a fluid amount left in the piping.

(3) U.S. Pat. No. 5,339,875 (corresponding to JP-A 305232/93 (tokkai-hei 05-305232)) shows, in order to avoid complicated liquid feed-line, a method for the preparation of a liquid for supplying to one or more pieces of apparatus using such a liquid characterized in that one or a plurality of vessels where desired liquid is to be formed visit one or more preparation stations each of which is solely for specified unit operation.

(4) JP-A 198100/95 (tokkai-hei 07-198100)shows a method and an apparatus for shortening the time for changing-over a product fluid to new one, which is made by separating a large pipe line system to several blocks to be able to wash each of the blocks concurrently, and restarting to feed the new product fluid into the block washing of which is completed without waiting for washing of whole pipe line system to be completed.

However, methods disclosed in (2) or (3) demand a large investment for the accompanying facilities and not so flexible to cope with a variety of change of a prescription of the fluid, which easily leads to further investment. Since based on unchanged pipe line, (1) or (4) does not require a lot of investment, but still needs additional pipe lines or connection changes of the complicated pipe line to cope with a variety of prescription changes.

Batch process has another problem to be solved when it is used for manufacturing a large amount of final product which requires amount of component material for the final product prepared by more than several batches. For example, typically in manufacturing photographic material such as photographic film/paper, required total amount of coating liquid, which is a component material for photographic film/paper, reaches several batches amount or up to more than hundred batches.

The problem is that some amount of prepared liquid component material in the batch process is left and wasted when the batch process manufacturing is over because the required total amount is usually not equal to an exact integral multiple of one batch amount. In the case of using expensive material such as emulsion and some additives for photographic coating liquid, the waste should be strictly avoided. It can be thought that amount to be prepared in final batch is adjusted to the fractional amount. However batch process has usually minimum amount to be able to treat because of minimum agitating amount of agitating vessel and/or minimum amount of liquid measuring device and so forth, so it is impossible to do that way if the fractional amount is less than the minimum amount.

SUMMARY OF THE INVENTION

An object of the invention is to provide a new designed system for batch process where a plurality of batch processing lines are simultaneously used for making a product, such as simultaneously multi-coated photographic film/paper, which is capable of easily coping with the change of raw materials or prescriptions for the product without increasing or changing existing pipe lines or chemical liquid stock vessels.

Another object of the invention is to provide a method for minimizing a waste of raw material left in batch process where an amount of material corresponding to a plurality of batches is used for manufacturing a final product.

The new designed system includes a plurality of chemical liquid preparation lines, each of which includes one or more multi-purpose primary chemical liquid preparation vessels, one or more multi-purpose chemical liquid stock vessel each of which is connected to each of the multi-purpose primary chemical liquid preparation vessels, one or more chemical liquid measuring device each of which is connected to each of the multi-purpose chemical liquid stock vessels, a single secondary chemical liquid preparation vessel, and piping connected to the chemical liquid measuring devices to feed the chemical liquid in the chemical liquid stock vessels to the single secondary chemical liquid preparation vessel. A required change of the chemical liquid can be made by replacing the chemical liquid in each of the vessels with new ones without affecting another chemical liquid preparation line in changing prescription for the following downstream process.

In the preferred embodiment, the system includes a common chemical liquid preparation vessel for preparing common chemical liquid used in the plural chemical liquid preparation lines, a common chemical liquid stock vessel connected to the common chemical liquid preparation vessel, and piping connected to the common chemical liquid stock vessel with branches for feeding the common chemical liquid into each of the secondary chemical liquid preparation vessels.

The method for minimizing a waste of raw material includes the following steps:

calculating a necessary amount (A) of the material for the following process; and determining a real amount (B) to be prepared in the following batch process by use of a maximum amount per one batch process M-max, a minimum amount per one batch process M-min, and a standard amount M-st that is determined between the maximum amount M-max and the minimum amount M-min.

If the necessary amount (A) is more than twice standard amount M-st, the real amount (B) is determined as the standard amount M-st. If the necessary amount (A) is between twice standard amount and a maximum amount M-max, the real amount (B) is determined as a half of the necessary amount (A)/2. If the necessary amount (A) is between the maximum amount M-max and the minimum amount M-min, the real amount (B) is determined as the necessary amount (A). If the necessary amount (A) is less than the minimum amount M-min, real amount (B) is determined as the minimum amount M-min.

BRIEF DESCRIPTION OF DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE INVENTION

Figure 1:
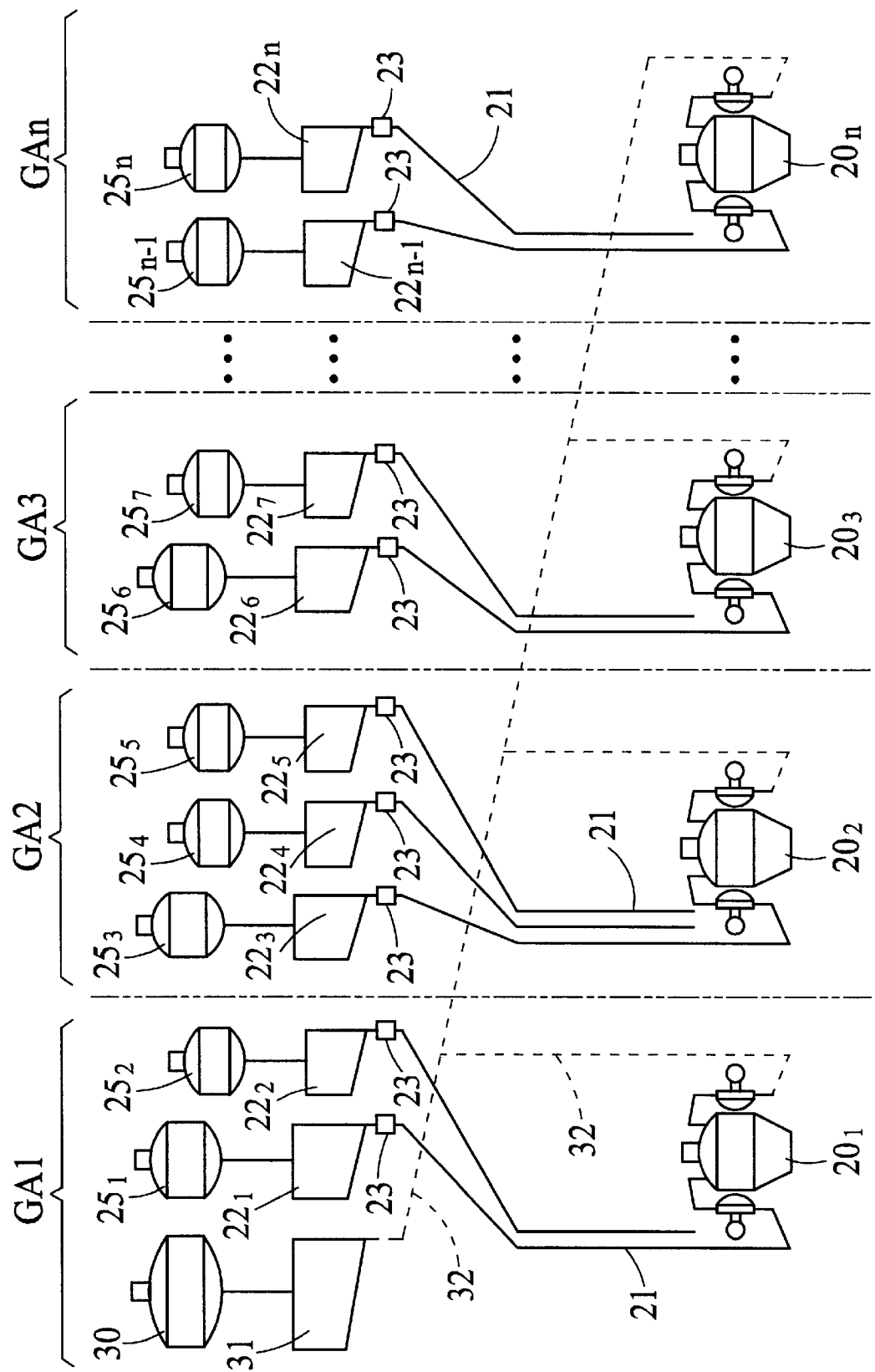
FIG. 1 shows a schematic diagram of coating/chemical liquids preparation system of the invention.

FIG. 1 shows schematic diagram of coating liquids preparation system of the invention for producing a photographic coated material. The coating liquid preparation system is constituted by a plurality of coating liquid preparation lines GA1-GAn, each of which is independent from each other and usually consist of single coating liquid preparation vessel 20, a plurality of multi-purpose chemical liquid stock vessels 22 and a plurality of multi-purpose chemical liquid preparation vessels 25.

The number of coating liquid preparation vessels (secondary vessels) 20-1-20-n depends on the number of coating layers required to a specified coated material. Therefore the number of the preparation vessels usually meets the number of coating layers for a product which requires maximum number of the layers.

Multi-purpose chemical liquid stock vessels 22-1-22-n are connected to the coating liquid preparation vessels 20-1-20-n respectively via piping 21. A chemical liquid measuring device 23 is installed in each piping 21 which is for feeding a required amount of chemical liquid to each of the coating liquid preparation vessels 20-1-20-n.

Multi-purpose chemical liquid preparation vessels (primary vessels) 25-1-25-n, where a predetermined chemical liquid is prepared by throwing in raw materials such as water, methyl alcohol and others, are connected to the multi-purpose chemical liquid stock vessels 22-1-22-n respectively.

Each of coating liquid preparation lines GA1-GAn includes one or more chemical liquid feeding lines each of which constitutes a single chemical liquid feeding line(with no branching), to the single coating liquid preparation vessel 20, consisting of the multi-purpose chemical liquid preparation vessel 25, multi-purpose chemical liquid stock vessel 22, the chemical liquid measuring device 23 and piping 21. In other words, each chemical liquid feeding line is exclusive to the single coating liquid preparation vessel 20.

In this embodiment, the coating liquids preparation system has a common chemical liquid feeding line including a common chemical liquid preparation vessel 30, a common chemical liquid stock vessel 31 and piping 32 with branches for feeding common liquid into each of the coating liquid preparation vessels 20-1-20-n. It is still preferable to have a common chemical liquid feeding line in the case where same chemical liquid is commonly used for preparing each coating liquid and expected to be used for long period.

At changeover to produce another photographic coated material, each chemical liquid feeding line is washed and cleaned and then raw materials according to the new prescription for another photographic coated material is thrown in to prepare a new chemical liquid.

Figure 4:
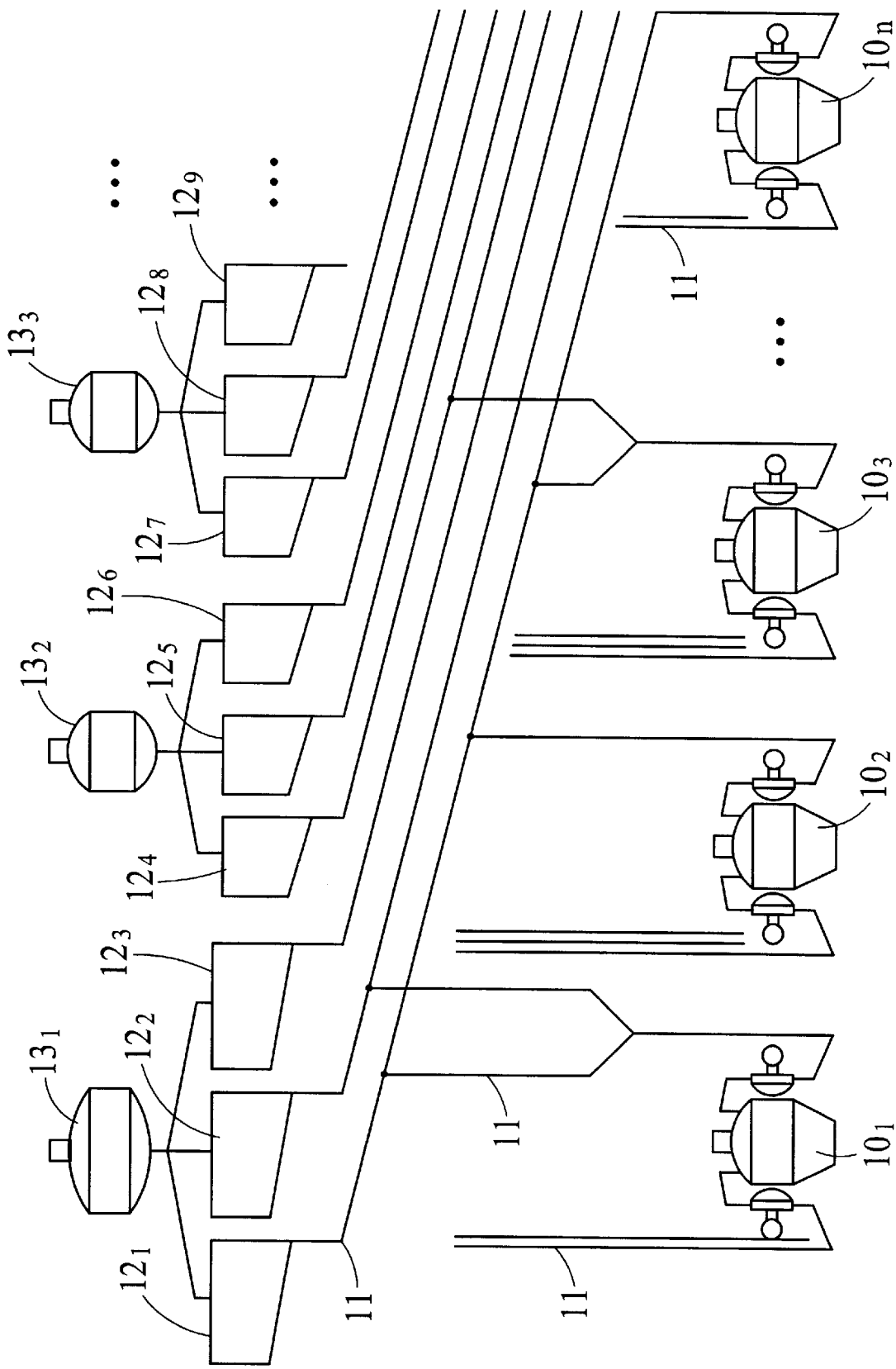
FIG. 4 shows a schematic diagram of conventional coating/chemical liquids preparation system.

Above mentioned coating liquid preparation system of the invention may increase the number of chemical liquid preparation vessels because no chemical liquid preparation vessel is commonly used as in conventional system as shown in FIG. 4. However the system of the invention gives very simple structure of pipe lines, unlike very complicated ones in conventional system, to deliver chemical liquids, which leads to a lot of advantages. It generally gives easy maintenance of the chemical liquid feeding lines because of simple straight-line layout and structure as to each coating liquid preparation line. The piping of the system does not make crossover to each other, and can avoid branch piping and elbow pipes which leads to improvement of cleaning and expect no wrong connection of piping by operator at changeover. This system makes also it easy to accurately calculate necessary amount of chemical liquid to be prepared for another batch of the same chemical liquid when needed because one chemical liquid feeding line is exclusive to one coating liquid preparation vessel 20, which make it easy to find exact amount of remaining liquid in the line without taking into account the remaining amount to be allocated to other coating liquid preparation vessels as in the conventional system. This results in reducing the chemical liquid amount left in the end of operation and wasted.

In this system, it may happen that the different coating liquid preparation lines have the same chemical liquid to be prepared. Even so, as computer-aided control system can accurately provide necessary amount of chemical liquid for each coating liquid preparation line, total amount of the chemical liquid to be wasted could be less or equal to that in the conventional system. As a whole this system is thought to be relatively flexible to cope with frequent change of prescription for the product because the system has sufficient number of chemical liquid feeding lines and each of them is independent from others, which allows each chemical liquid feeding line to prepare new chemical liquid without worrying about the effects to others and whole chemical liquid feeding lines to supply all necessary chemical liquids without building additional stock vessels, liquid measuring devices and piping as in case of conventional system.

In the embodiment described above, common chemical liquid for each coating liquid preparation line is prepared in the common vessel 30 and stocked in the common stock vessel 31 and distributed to each coating liquid preparation vessel 20 through the piping 32 with branches. However, it is possible that each coating liquid preparation line has its own chemical liquid feeding line of the common liquid, which is exclusive to single coating liquid preparation vessel 20 same as in other chemical liquid feeding lines.

As for coping with the fractional amount in the total required amount to minimize the leftover to be wasted, it is one of effective ways that final three batches are used to allocate the total required amount by the following process at the time to each of three batches so that any one of the batches can have an allocated amount of the liquid any of which is more than minimum amount for the batch process. For example, if the total required amount corresponds to 3.0 batches scale, each of three batches treats one (1.0) batch amount, but if the total required amount is 2.9 batches, then the first batch of the final three treats 1.0 batch, the second treats 1.0 batch and the final treats 0.9 batch. When the total required amount ranges from 2.8 to 2.0, the allocation is as follows;

| | |
|---|---|
| 2.8 | (1.0, 1.0, 0.8) |
| 2.7 | (1.0, 1.0, 0.7) |
| 2.6 | (1.0, 0.9, 0.7) |
| 2.5 | (1.0, 0.8, 0.7) |
| 2.4 | (0.9, 0.8, 0.7) |
| 2.3 | (0.9, 0.7, 0.7) |
| 2.2 | (0.8, 0.7, 0.7) |
| 2.1 | (0.7, 0.7, 0.7) |

In above example, the liquid amount the batch process can treat can vary from 1.0 (one batch amount)(standard amount to be treated in the batch process) to 0.7 batch amount (minimum amount to be treated). Combination of the each allocated amount is not limited to the one shown above and the minimum amount to be treated is not limited to 0.7 which depends on the batch process to be used. However it is recommended to allocate the amount=in order from larger one to smaller one as much as possible considering stability of the process and required time to prepare the amount for the following cycle. If the first allocation amount is 0.7 and second one is 1.0, it may happen that a preparation time for 1.0 amount is longer than consuming time of previous 0.7 amount in the following process, which results in that the liquid runs out before newly prepared liquid starts to be fed to the following process.

Above mentioned method will still cause a loss of the prepared liquid of 0.1 batch amount, real amount to be wasted could not be fairly small if the normal prepared amount of the batch is large. And requirement of final three batches make it difficult to cope with the trouble which may happen after entering the final three batches stage. Further improved method is described below.

Figure 2:
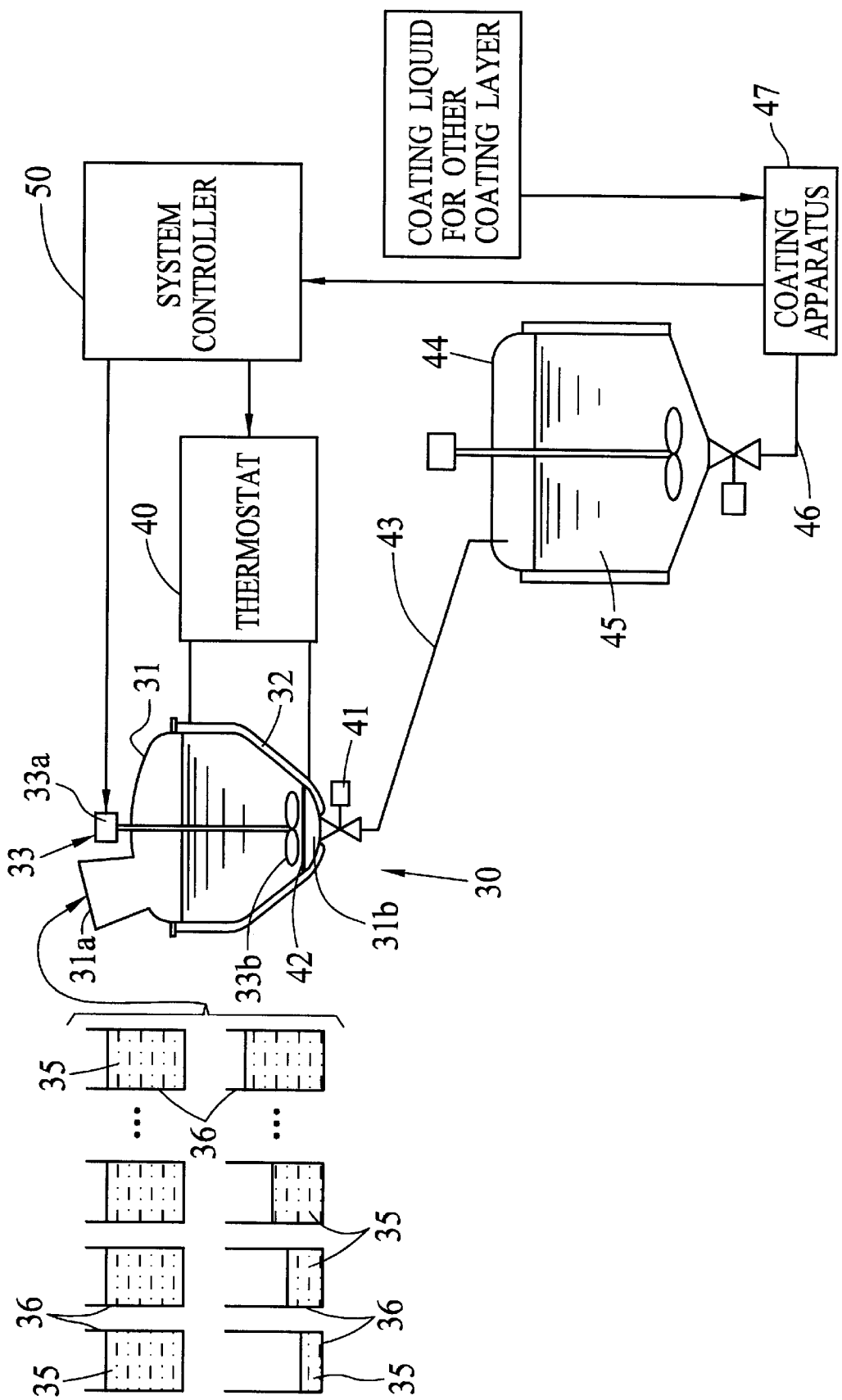
FIG. 2 shows a schematic diagram of the batch system for preparing coating liquid where the method of the invention is applied.

FIG. 2 shows a schematic diagram of the batch system for preparing coating liquid where the method of the invention is applied. In the drawing the batch system shown is for only one coating liquid. Other batch systems for other coating liquids to be used for simultaneous multi-coating in actual manufacturing are not shown. A melting vessel 30 to prepare the coating liquid is formed by a body 11, a jacket 32 and an agitator 13.

The coating liquid preparation vessel 20 in FIG. 1 corresponds to the melting vessel 30 or can be a mixing vessel for chemical liquids without melting gelled material. In the latter case, the mixed chemical liquids prepared in the vessel 20 in FIG. 1 is added into the melted gelled material in the melting vessel 30 in FIG. 2.

The body 31 has an opening 31a for casting a gelled material 35 contained in a container 36 therethrough. The gelled material 35 in this embodiment contains a photographic emulsion, a mat agent or other gelled emulsion which has been prepared in another vessel (not shown) and stocked in an exclusive container 36 kept in refrigerator in advance. Most of the container 36 contains corresponding amount of the gelled material 35 to normal one batch processing. Some of containers 36 contain a variety of fractional amounts of the gelled material 35 to easily cope with adjustment of an amount to be prepared for meeting the real amount demanded by the following downstream process in a few batches in the final stage shortly before the following downstream process, to which a melted one from the gelled material 35 is fed, is finished. In other words, preparation of a variety of fractional amount in advance can easily adjust the amount to be prepared by merely throwing in the raw material in single container or combination of a couple of containers, otherwise it is necessary to scoop specified amount of the raw material from the container containing normal one batch amount by using gel slicing machine which often gives inaccurate amount.

The jacket 32 covers most of the outer surface of the body 31. Heated liquid media, of which temperature is controlled by a thermostat 40 in the range of 40° C. to 80° C., is circulated through the jacket 32 to melt the gelled material 35 inside the body 31.

The agitator 33 formed by a motor 33a and agitating blade 33b is used to make the gelled material 35 contact the wall of the body 31 sufficiently, which helps the gelled material 35 melt and the melted liquid flow down to the bottom of the body 31.

Wire netting 42 made of stainless steel or plastics covers a bottom exit 31b from which the melted liquid is drained through a T-shaped valve 41 into a reservoir 44. The mesh size of the wire netting 42 is from 0.5 to 1.0 mm.

A feeding piping 43 is connected to the body 11 via the T-shaped valve fixed on the bottom of the body to feed a coating liquid into the reservoir 44. The prepared coating liquid in the melting vessel 30 is continuously fed into the reservoir 44 through the T-shaped valve 41 with appropriate valve opening.

The coating liquid 45 reserved in the reservoir 44 is fed into a coating apparatus 47 by a metering pump (not shown) installed in a feeding line 46 such as pulseless duplex diaphragm pump. In the lines 43 and/or 46 may be installed another type of pump such as a gear pump, a snake pump or a rotary pump, a deaerator or a flow-rate controller, if necessary.

A system controller 50 controls a temperature and a flow rate of the heating media through the thermostat 40 and a rotational speed of the agitator through a motor 33a to control melting the gelled material, and also determines whether the batch process at present is for normal stage or final stage according to a calculated necessary amount (A) in the following process of manufacturing a coated photographic material. In the normal batch process, a standard preparation amount (M-st) is adopted as a real amount (B) to be prepared for the batch, which is less than a maximum amount (M-max) the melting vessel 11 can treat. If the calculated necessary amount (A) becomes less than twice the standard preparation amount (M-st), it is determined that the batch process has reached final stage where the real amount (B) to be prepared changes according to a program.

Figure 3:
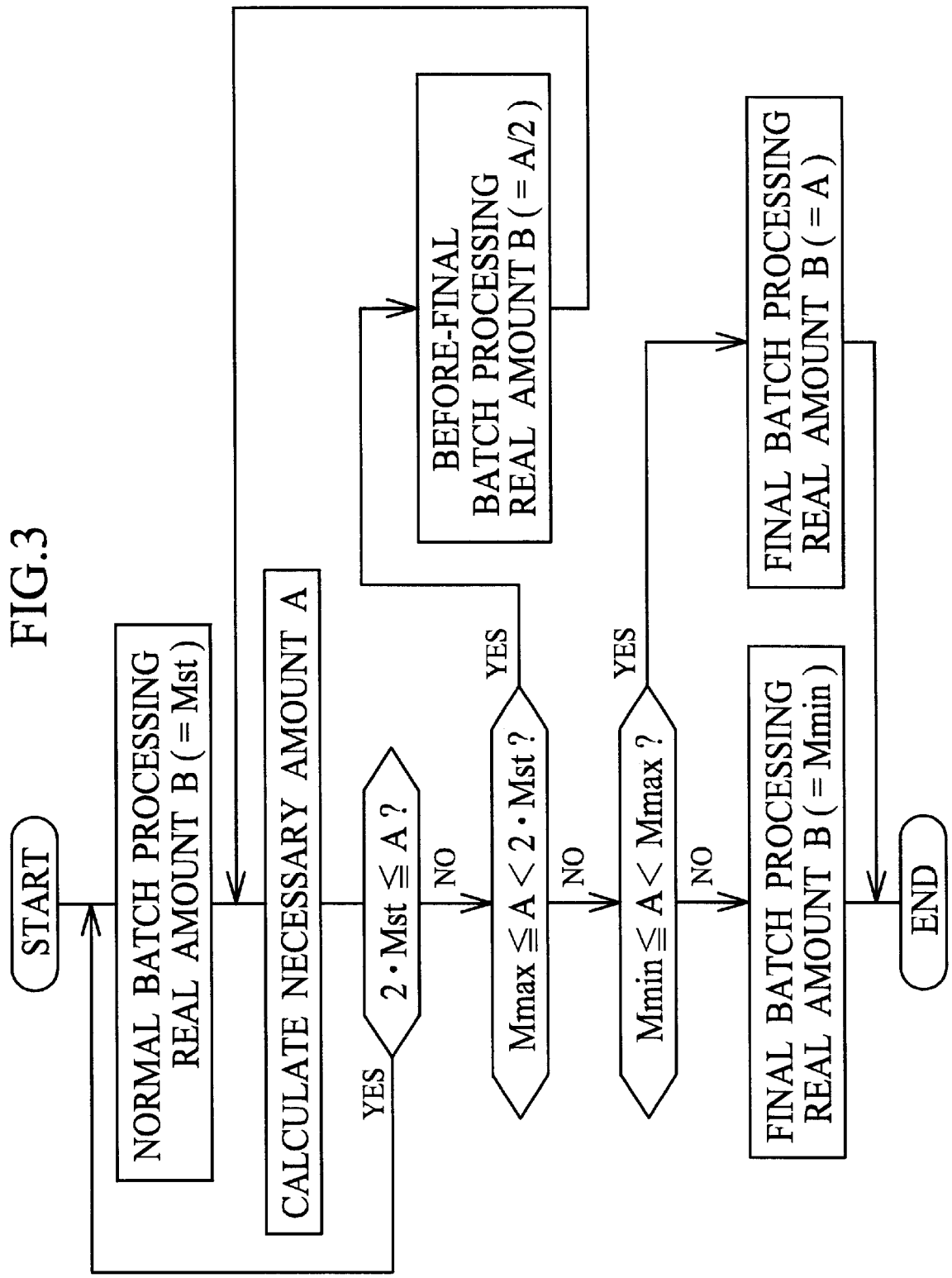
FIG. 3 shows a flow chart for determining the amount to be prepared in the melting vessel for each batch.

FIG. 3 shows a flow chart for determining the amount to be prepared in the melting vessel for each batch according to the calculated necessary amount (A). To begin with, the necessary amount (A) required by the following coating process is calculated at every time before preparing next batch as follows;

first, total coating area to be made at the time is calculated, then total amount of necessary coating liquid (C) to be used is calculated for each coating layer by multiplying required coating thickness of the layer by the total coating area in the previous calculation, and finally the necessary amount (A) for coating liquid for one layer is obtained by subtracting remaining amount (D) in the total system for the coating of the layer from the calculated total amount of necessary coating liquid (C). The necessary amount (A) for each of other layers is obtained in the same ways.

If the necessary amount (A) calculated is between maximum amount M-max and minimum amount M-min (that is; M-max>A≧M-min), the amount (A) is selected for the real amount (B) to be prepared, which becomes final batch processing. If the necessary amount (A) calculated is less than minimum amount M-min (that is; M-min>A), then the minimum amount M-min is selected for the real amount (B) to be prepared, which also becomes final batch processing.

If the necessary amount (A) calculated is equal to or more than twice the standard preparation amount (M-st)(that is; A≧2·M-st ), the standard preparation amount (M-st) is selected for the real amount (B)to be prepared. If the necessary amount (A) is between 2*M-st and M-max (that is; 2·M-st>A≧M-max), this means the process comes into the immediately-before final batch, a half of the necessary amount (A) (that is; A/2) is selected for the real amount (B) to be prepared. If the A/2 is less than M-min (that is; A/2<M-min), M-min is selected as the real amount (B) to be prepared. Then the next final batch processing is made as mentioned at the top of this paragraph according to the case where M-max>A≧M-min or M-min>A.

The way described above can easily cope with some troubles which occurs in the manufacturing process after fixing an adjusting amount of coating liquid in the final stage by reducing the number of batch processing for preparing the coating liquid to one or two.

If the melting vessel and the system controller allow the maximum amount M-max to be more than or equal to twice the minimum amount M-min (that is; M-max≧2·M-min), the real amount (B) becomes A/2 when the calculated necessary amount (A) is between 2·M-st and M-max (that is; 2·M-st>A≧M-max), which leads to a real amount (B) in the final batch of A/2 unless any trouble happens. And A/2 is always larger than M-min because A/2≧M-max/2≧M-min derived from two expression of inequalities above, which means final batch amount A/2 can be prepared without adding extra amount of raw material, therefore no prepared amount is wasted.

Supposing that the maximum amount M-max is 1.0, usually the standard amount M-st can be 0.6–0.9 and the minimum amount M-min can be 0.1–0.4 and those range are preferable.

In the case where the batch system of the melting vessel and the system controller does not meet the relation M-max≧2·M-min, if the amount of A/2 is selected for a real amount (B) in the final batch processing and A/2 is less than minimum amount M-min, the A/2 has to be replaced by the minimum amount M-min. This causes extra amount (M-min−B) to be wasted. However, as the possibility of this happening is not high in the real system, the method is still better as a whole than the final three batch adjusting method which may waste 0.1 batch amount.

If the necessary amount is more than twice the maximum amount M-max, the maximum amount M-max or an amount between the maximum amount M-max and the standard amount M-st is selected for the real amount (B). By this way it is possible to make use of maximum capacity of the batch system in normal stage batch processing before the final stage.

In the inequality expressions described above, it does not matter practically whether the inequality expression includes an equality sign or not.

It is easily understand that the invention explained above can be applied to other batch system in the field of chemical plant or food plant where the similar materials are treated.

The invention has been explained with respect to batch system for coating liquid preparation where a variety of coating liquid are prepared separately and used simultaneously. The method and system of the invention can be of course applied to other fields such as chemical plant or food manufacturing plant as long as those plants need to produce a variety of chemical liquids simultaneously.

Thus, the present invention is not to be limited to the above embodiments, but on the contrary, various modifications are possible to those skilled in the art without departing from the scope of claims appended hereto.

What we claim is:

1. A method for preparing a material in a batch process by throwing in a raw material and feeding the prepared material to a following downstream process, the method comprising steps of:
    calculating a necessary amount of the material for the following process; and
    allocating the calculated amount of the material to following predetermined number of batches if the calculated necessary amount is less than a predetermined amount, an allocated amount being equal to or more than a minimum amount one batch process can treat.

2. A method as claimed in claim 1, wherein the predetermined amount is less than three times a standard amount one batch process treats and the predetermined number of batches is three.

3. A method for preparing a material in a batch process by throwing in a raw material and feeding the prepared material to the following process, the method comprising steps of:

calculating a necessary amount (A) of the material for the following process; and determining a real amount (B) to be prepared in the following batch process by use of a maximum amount per one batch process M-max, a minimum amount per one batch process M-min, and a standard amount M-st that is determined between the maximum amount M-max and the minimum amount M-min, the real amount being determined by the following steps:

determining the real amount (B) as the standard amount M-st if the necessary amount (A) is more than twice standard amount M-st;

determining the real amount (B) as a half of the necessary amount (A)/2 if the necessary amount (A) is between twice standard amount and a maximum amount M-max;

determining the real amount (B) as the necessary amount (A) if the necessary amount (A) is between the maximum amount M-max and the minimum amount M-min; and determining the real amount (B) as the minimum amount M-min if the necessary amount (A) is less than the minimum amount M-min.

4. A method as claimed in claim 3, wherein the maximum amount M-max is more than twice the minimum amount M-min.

5. A method as claimed in claim 3, further comprising a step of:

determining the real amount (B) as the minimum amount M-min when the real amount (B) is set to the half of the necessary amount (A)/2 and the minimum amount M-min is more than the half of the necessary amount (A)/2.

6. A method as claimed in claim 3, further comprising a step of:

determining the real amount (B) as the maximum amount M-max or an amount between the maximum amount M-max and the standard amount M-st if the necessary amount (A) is more than twice the maximum amount M-max.

7. A method as claimed in claim 3, further comprising a step of:

providing a standard container containing a necessary amount of the raw material to be thrown in one batch process, and plural fractional containers each of which contains the raw material smaller than the necessary amount; and selecting a proper container among the standard container and the fractional containers in accordance with the real amount (B).

8. A method as claimed in claim 4, further comprising a step of:

providing a standard container containing a necessary amount of the raw material to be thrown in one batch process, and plural fractional containers each of which contains the raw material smaller than the necessary amount; and selecting a proper container among the standard container and the fractional containers in accordance with the real amount (B).

9. A method as claimed in claim 5, further comprising a step of:

providing a standard container containing a necessary amount of the raw material to be thrown in one batch process, and plural fractional containers each of which contains the raw material smaller than the necessary amount; and selecting a proper container among the standard container and the fractional containers in accordance with the real amount (B).

10. A method as claimed in claim 6, further comprising a step of:

providing a standard container containing a necessary amount of the raw material to be thrown in one batch process, and plural fractional containers each of which contains the raw material smaller than the necessary amount; and selecting a proper container among the standard container and the fractional containers in accordance with the real amount (B).

11. A method for preparing a material in a batch process by throwing in a raw material into a batch system and feeding the prepared material to the following process, the batch system including a plurality of material preparation lines, each of which including one or more multi-purpose primary material preparation vessels, one or more multi-purpose material stock vessel each of which is connected to each of the multi-purpose primary material preparation vessels, one or more material measuring device each of which is connected to each of the multi-purpose material stock vessels, a single secondary material preparation vessel, and piping connected to the material measuring devices to feed the material in the material stock vessels to the single secondary material preparation vessel, and a required change of the chemical liquid being made by replacing the material in each of the vessels with new ones without affecting another material preparation line in changing prescription for the following downstream process, the method comprising steps of:

calculating a necessary amount (A) of the material for the following process; and determining a real amount (B) to be prepared in the following batch process by use of a maximum amount per one batch process M-max, a minimum amount per one batch process M-min, and a standard amount M-st that is determined between the maximum amount M-max and the minimum amount M-min, the real amount being determined by the following steps:

determining the real amount (B) as the standard amount M-st if the necessary amount (A) is more than twice standard amount M-st;

determining the real amount (B) as a half of the necessary amount (A)/2 if the necessary amount (A) is between twice standard amount and a maximum amount M-max;

determining the real amount (B) as the necessary amount (A) if the necessary amount (A) is between the maximum amount M-max and the minimum amount M-min; and determining the real amount (B) as the minimum amount M-min if the necessary amount (A) is less than the minimum amount M-min.

* * * * *